United States Patent [19]

Reasoner

[11] Patent Number: 5,632,182

[45] Date of Patent: May 27, 1997

[54] SERVICEABLE CLIP CORE COUPLING

[75] Inventor: Michael Reasoner, Ortonville, Mich.

[73] Assignee: Teleflex Incorporated, Plymouth Meeting, Pa.

[21] Appl. No.: 560,803

[22] Filed: Nov. 21, 1995

Related U.S. Application Data

[63] Continuation-in-part of Ser. No. 521,125, Aug. 29, 1995, Pat. No. 5,577,415.

[51] Int. Cl.$^6$ ........................................... F16C 1/14
[52] U.S. Cl. ............................................ 74/502.4; 403/327
[58] Field of Search ................................ 74/502.4, 502.6, 74/502; 403/DIG. 7, 327, 300, 294

[56] References Cited

U.S. PATENT DOCUMENTS 4,654,951  4/1987  Myer .......................... 403/DIG. 7 X
5,039,138  8/1991  Dickirson .
5,509,750  4/1996  Boike ........................... 74/502.4 X

*Primary Examiner*—Charles A. Marmor
*Assistant Examiner*—Mary Ann Battista
*Attorney, Agent, or Firm*—Howard & Howard

[57] ABSTRACT

A motion transmitting remote control assembly (10) of the type for transmitting motion in a curved path and comprising first and second core element sections (12 and 14) movably supported in first and second conduits (16 and 20). Female (24) and male (26) members define the inner ends of the core element sections (12 and 14) and the assembly (10) is characterized by a U-shaped clip (28) manually insertable into and manually removable from slots (32) in the female member (24) to engage a male groove (30) in the male member (26) to mechanically lock the core element sections (12 and 14) together while moving axially.

12 Claims, 2 Drawing Sheets

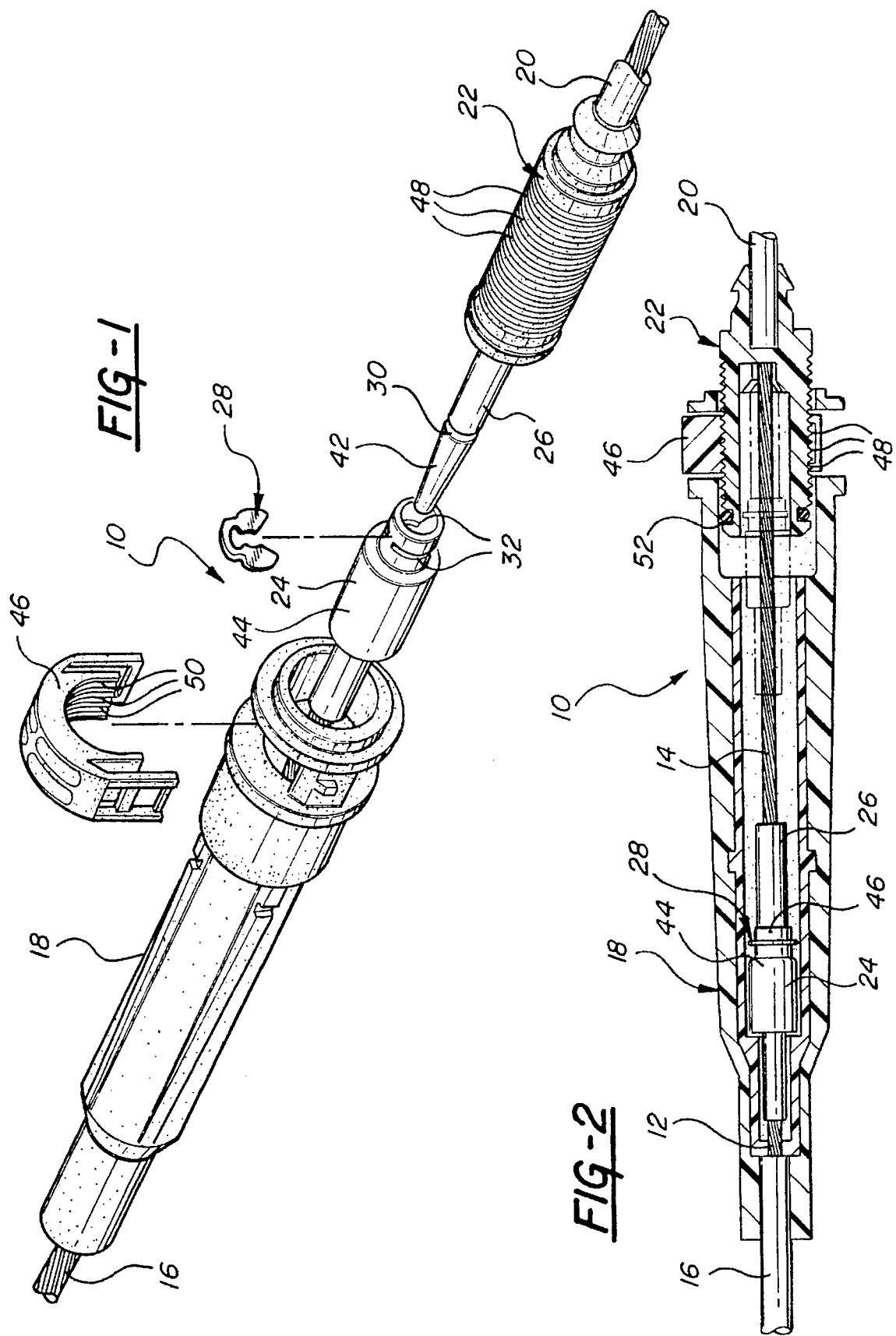

SERVICEABLE CLIP CORE COUPLING

This application is a continuation-in-part of application Ser. No. 08/521,125 filed Aug. 29, 1995 now U.S. Pat. No. 5,577,415 in the name of the inventor hereof and assigned to the assignee herein.

TECHNICAL FIELD

The subject invention relates to a remote control assembly of the type for transmitting motion in a curved path by a flexible motion transmitting core element and, more specifically, to such an assembly which is manufactured in two axially separate parts which are mated during installation.

BACKGROUND OF THE INVENTION

Such remote control assemblies are used in automotive vehicles. For example, such a remote control assembly may interconnect the accelerator pedal and the fuel flow control system in an automobile. In numerous installations it is necessary to attach the outward ends of the two halves to a support structure before the routing of the conduit can be completed. Such assemblies are divided into a first guide or conduit movably supporting a first core element section and a second guide or conduit movably supporting a second core element section with means for connecting the core element sections together. For the purposes of installation, it is necessary that the core element sections be easily connectable to one another. An assembly for connecting such an assembly together is disclosed in U.S. Pat. No. 5,039,138 in the name of G. D. Dickerson. However, it frequently occurs that later in the life of the automobile there is also a need to take the two conduit and core sections apart for service to the automobile.

SUMMARY OF THE INVENTION AND ADVANTAGES

A motion transmitting remote control assembly of the type for transmitting motion in a curved path and comprising first and second core element sections movably supported in first and second guide lengths and connection means for locking the first and second core element sections together in a locked position mechanically prevented from moving relative to one another axially in either direction. The assembly is characterized by the connection means including a clip manually insertable into and manually removable from the locked position mechanically interlocking the core element sections together while moving axially within the guide lengths.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an exploded perspective view of a preferred embodiment;

FIG. 2 is a cross sectional view of the assembly of FIG. 1 in the fully connected and locked position;

DETAILED DESCRIPTION OF THE PREFERRED EMBODIMENT

Figure 3:
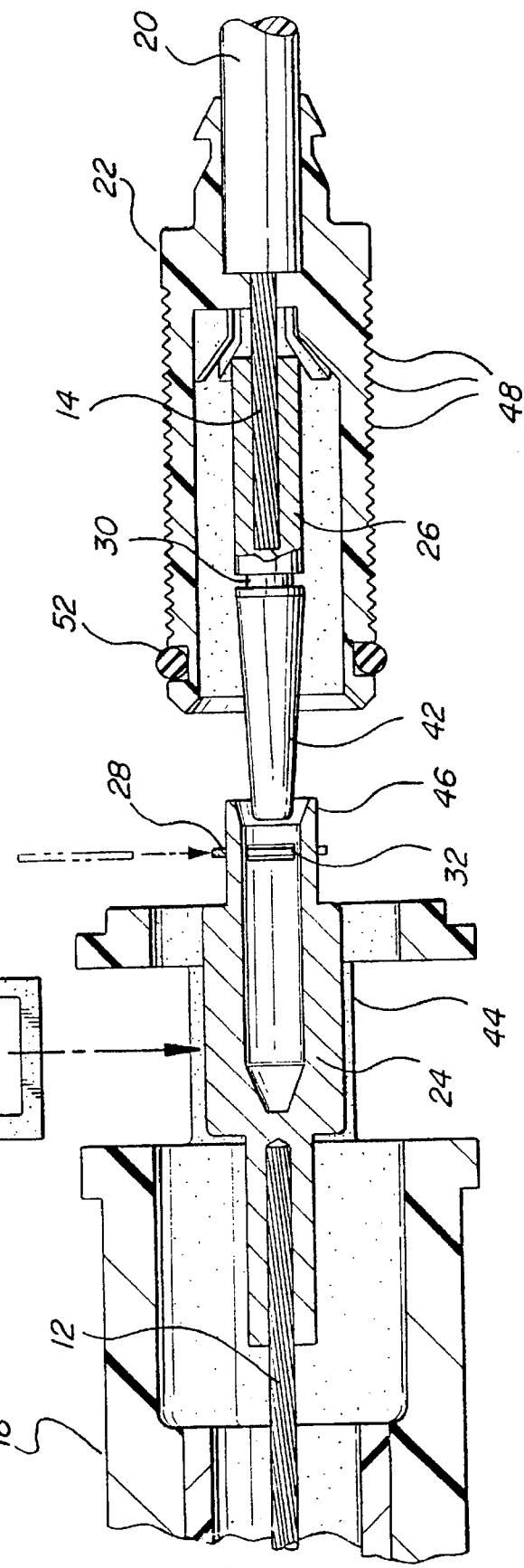
FIG. 3 is a cross sectional view showing the assembly in the pre-connected or shipping condition.

Referring to the Figures, wherein like numerals reference like or corresponding parts throughout the several views, a motion transmitting remote control assembly of the type for transmitting motion in a curved path by a flexible motion transmitting core element is generally shown at 10.

The assembly 10 is divided into two components with one component including a first core element section 12 for transmitting motion and a first guide length for movably supporting the first core element section 12 and the second component including a second core element section 14 for transmitting motion and a second guide length for movably supporting the second core element section 14. The first guide length comprises a conduit 16 and a fitting or ferrule 18 bonded to the conduit at the end thereof and the second guide length comprises a conduit 20 and a fitting or ferrule 22 bonded thereto at the end thereof. Each core element section 12 and 14 is of the type well known in the art consisting of a single wire or of a multi-stranded plurality of smaller wires. The conduits 16 and 20 are of the well known type including an inner tubular member made of organic polymeric material and surrounded by long lay wires wrapped helically around the inner tubular member and encased in an extruded casing, also of organic polymeric material. The fitting or ferrules 18 and 22 are also made of organic polymeric material, but a rigid material.

Figure 4:
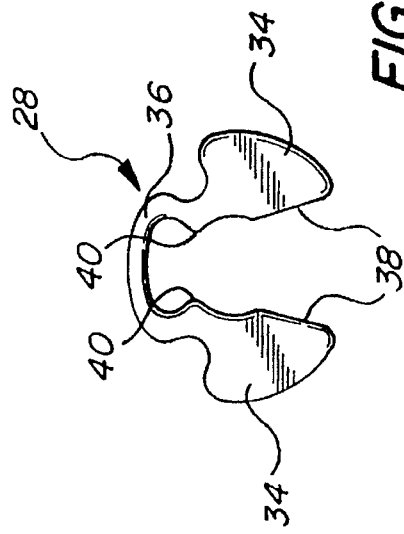
FIG. 4 is an enlarged view of the preferred embodiment of the U-shaped clip used in the subject invention.

The assembly 10 also includes connection means for locking the first and second core element sections 12 and 14 together in a locked position mechanically prevented from moving relative to one another axially in either direction. The connection means includes a female member 24 attached defining the end of the first core element section 12 and a male member 26 defining the end of the second core element section 14. More specifically, the assembly is characterized by the connection means including a clip, generally indicated at 28, and manually insertable into and manually removable from the locked position mechanically interlocking the male 26 and female 24 members of the core element sections 12 and 14 together while moving axially within the guide lengths. The male member 26 presents a male groove 30. The female member has a pair of slots 32 extending tangentially therethrough. The clip 28 is disposed about the female member 24 and extends through the slots 32 and into the male groove 30 for mechanically interlocking the core element sections 12 and 14 together in the locked position. As best illustrated in FIG. 4, the clip 28 is generally U-shaped with the legs 34 of the U-shape being flexible for flexing apart during disposition about the female member 24 and snapping into the slots 32 and the male groove 30. As will be appreciated, the legs are allowed to move apart or flex and return to their steady state condition because the base 36 of the U-shape which interconnects the legs 34 acts like a spring, i.e., like a leaf spring. The pair of the slots 32 are diametrically opposed in the female member 24 with each of the slots 32 receiving one leg 34 of the clip 28 when in the locked position. To facilitate insertion of the clip 28 into the slots 32, each leg 34 of the clip 28 includes a curved or arcuate cam edge 38 for engaging the ends of the slots 32 to force the legs 34 to flex or move apart by bending the base 36 during insertion. In other words, the distance between the ends of the slots 32 is greater than the distance between the cam edges 38 to force the legs 34 to spring apart during insertion of the clip 28. The clip 28 also includes concave saddle edges 40 inwardly of the cam edges 38 for disposition about the male groove 30 when in the locked position. Accordingly, the distance between the saddle edges 40 of the legs 34 is less than the distance between the ends of the slots 32 whereby the clip 28 may be disposed in the slots 32 and retained therein during shipment. In other words, the clip 28 may be inserted into the slots 32 and retained on the female member only during shipment. To this, the male member 26 presents a conical nose 42 for engaging the saddle edges 40 and flexing or moving the legs 34 apart as the nose 42 is inserted into the female member 24 during assembly of the male member 26 into the female member 24, as the clip 28 is being held in place in the slots 32.

The female member 24 includes a large diameter length 44 and a small diameter length 46. The slots 32 are disposed in the small diameter length 46 and the large diameter length 44 is of a greater diameter than the maximum radial extent of the clip 28 when in the locked position. Therefore, the clip 28 is held in space and is prevented from catching or hanging up on any of the other components thereby assuring free movement of the connected core element sections 12 and 14.

The first 18 and second 22 fittings telescope together and a latch member 46 is included for movement into a latched position to prevent relative axial movement between the first and second fittings 18 and 22. The first fitting 18 has diametrically extending passageway and supports the latch member 46 therein for radial movement. The second fitting 22 includes teeth 48 the latch member 46 also has coacting teeth 50 for engaging the teeth 48 on the second fitting 22 to prevent the relative axial movement. The second fitting 22 also supports an O-ring seal 52 for sealing engagement with the interior of the first fitting 18.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) comprising:

a first core element section (12) for transmitting motion;

a first guide length for movably supporting said first core element section (12);

a second core element section (14) for transmitting motion;

a second guide length for movably supporting said second core element section (14);

connection means for locking said first (12) and second (14) core element sections together in a locked position mechanically prevented from moving relative to one another axially in either direction; and characterized by said connection means including a clip (28) manually insertable into and manually removable from said locked position mechanically interlocking said core element sections together while moving axially within said guide lengths, said connection means including a female member (24) attached to an end of said first core element section (12) and a male member (26) defining an end of said second core element section (14), said male member (26) presenting a male groove (30), said female member (24) having at least one slot (32) extending tangentially therethrough, said clip (28) being disposed about said female member (24) and extending through said slot (32) and into said male groove (30) for mechanically interlocking said core element sections together in said locked position.

2. An assembly as set forth in claim 1 wherein said clip (28) is generally U-shaped to define legs (34) which are flexible for flexing apart during disposition about said female member (24) and snapping into said slot (32) and said male groove (30).

3. An assembly as set forth in claim 2 including a pair of said slots (32) diametrically opposed in said female member (24) with each of said slots (32) receiving one of said legs (34) of said clip (28) in said locked position.

4. An assembly as set forth in claim 3 wherein each of said legs of said clip (28) includes a cam edge (38) for engaging ends of said slots (32) to force said legs (34) to flex apart during insertion.

5. An assembly as set forth in claim 4 wherein said cam edges (38) are arcuate.

6. An assembly as set forth in claim 5 wherein said clip (28) includes concave saddle edges (40) inwardly of said cam edges (38) for disposition about said male groove (30) in said locked position.

7. An assembly as set forth in claim 6 wherein the distance between said saddle edges (40) of said legs (34) is less than the distance between said ends of said slots (32) whereby said clip (28) may be disposed in said slots (32) and retained therein during shipment.

8. An assembly as set forth in claim 7 wherein said male member (26) presents a conical nose (42) for engaging and flexing said legs (34) apart during assembly of said male member (26) into said female member (24).

9. An assembly as set forth in claim 8 wherein said female member (24) includes a large diameter length (44) and a small diameter length (46), said slots (32) being disposed in said small diameter length (46), said large diameter length (44) being of a greater diameter than the maximum radial extent of said clip (28) when in said locked position.

10. An assembly as set forth in claim 9 wherein said first guide length includes a first fitting (18) and a first conduit (16) extending from said first fitting (18), said second guide length includes a second fitting (22) and a second conduit (20) extending from said second fitting (22), said first and second fittings (18 and 22) telescope together, and including a latch member (46) for movement into a latched position to prevent relative axial movement between said first and second fittings (18 and 22).

11. An assembly as set forth in claim 10 wherein said first fitting (18) supports said latch member (46) for radial movement and said second fitting (22) includes teeth (48), said latch member (46) having teeth (50) for engaging said teeth (48) on said second fitting (22) to prevent said relative axial movement.

12. An assembly as set forth in claim 11 wherein said first and second core element sections (12 and 14) include wire-like cores with said male (26) and female (24) and male (26) members attached to the respective ends thereof.

* * * * *